US006908541B2

(12) United States Patent
Kemner et al.

(10) Patent No.: US 6,908,541 B2
(45) Date of Patent: Jun. 21, 2005

(54) ELECTROLYTIC CATALYTIC OXIDATION SYSTEM

(75) Inventors: Mark Louis Kemner, Missoula, MT (US); Barri Ricky Twardoski, Florence, MT (US)

(73) Assignee: Maxim Technologies, Inc., Missoula, MT (US)

( * ) Notice: Subject to any disclaimer, the term of this patent is extended or adjusted under 35 U.S.C. 154(b) by 0 days.

(21) Appl. No.: 09/999,732

(22) Filed: Oct. 24, 2001

(65) Prior Publication Data

US 2003/0075435 A1 Apr. 24, 2003

(51) Int. Cl.[7] ............................................. C02F 1/461
(52) U.S. Cl. ...................... 205/758; 204/242; 204/263; 204/269; 204/275.1
(58) Field of Search ........................... 205/758; 204/242, 204/263, 269, 275.1

(56) References Cited

U.S. PATENT DOCUMENTS

| | | | | |
|---|---|---|---|---|
| 4,436,601 A | * | 3/1984 | Branchick et al. | 205/758 |
| 4,445,990 A | * | 5/1984 | Kim et al. | 205/758 |
| 6,342,150 B1 | * | 1/2002 | Sale et al. | 205/688 |
| 6,391,184 B1 | * | 5/2002 | Orolin et al. | 205/687 |

FOREIGN PATENT DOCUMENTS

WO          WO 95/21795          * 8/1995

* cited by examiner

*Primary Examiner*—Arun S. Phasge
(74) *Attorney, Agent, or Firm*—Gardere Wynne Sewell LLP

(57) ABSTRACT

A method and system for electrolysis of water to increase the dissolved oxygen content, raise oxidation reduction potential, and perform direct oxidation of dissolved contaminants in situ. This is accomplished by an electrolytic catalytic oxidation (ECO) cell having an innovative configuration of electrodes in a cartridge designed to maximize water contact with an efficiently designed affecting system. The cartridge consisting of multiple mesh electrodes arranged transversely to imposed water flow electrolyzes passing water when energized. The mesh construction of the electrodes allows water flow to be essentially through the electrodes, with a narrow gap set up between cathode and anode to reduce voltage requirements of the system. The cartridge anodes are preferably plated with a mixed metal oxide such as iridium oxide and ruthenium oxide to catalytically improve the production of oxygen. The electrode cores are constructed of titanium, combining low electrical resistance with low activity, reducing metal loss during system operation.

16 Claims, 2 Drawing Sheets

ELECTROLYTIC CATALYTIC OXIDATION SYSTEM

The present invention relates to oxygenation and electrical oxidation of dissolved contaminants through electrolysis of groundwater to remove or neutralize contaminants in soil and groundwater, and to promote biodegradation through aerobic microbial processes.

BACKGROUND OF THE INVENTION

Introduction of oxygen into soil and groundwater for the purpose of removing or neutralizing contaminants is known. Some of those known means include the following:

In in-situ air sparging, a surface-mounted air compressor is used to force atmospheric air into the subsurface below the depth of the water table. The bubbling of air through the water in sparging wells acts to dissolve oxygen into the groundwater and transfer contaminants to air. The disadvantage of this system is that it has high capital costs for installation and maintenance of compressors, noise, and limited effectiveness by transferring contaminants to another media. Additionally, air is mostly nitrogen, so relatively less oxygen is exposed to groundwater for dissolution.

Oxygen sparging is similar to air sparging, except that a small blower is used and pure oxygen replaces air forced into the subsurface. The disadvantages of this system are similar to air sparging, except oxygen exposure is increased. However, cost of oxygen gas cylinders is added to operation and maintenance.

In another system, a bag of solid material that releases oxygen at a slow constant rate upon contact with groundwater acts to increase the content of oxygen in the aquifer. Upon exhaustion of the material, it is replaced with another bag of oxygen-releasing material. The disadvantage of this system is that relatively low amounts of oxygen are introduced compared to other technologies. Furthermore, the oxygen content is only increased in water that comes within close proximity to the bag of material. Accordingly, this application is not appropriate at sites where quick treatment is needed.

In another system, pure oxygen is passed down a tube to a cartridge submerged in groundwater. A series of long porous Teflon (R) tubes containing this oxygen are exposed to the groundwater and oxygen dissolves into the groundwater through diffusion and direct dissolution. A disadvantage with this system is that oxygen distribution to the aquifer is limited by the diffusion and dissolution rate for the groundwater and environmental conditions such as temperature and pH. Additionally, there is no transport mechanism as part of this application, so movement of oxygenated water is limited by the hydraulic gradient of the groundwater.

In another system, electrolysis of the groundwater itself is used to add oxygen. Electrolysis is the dissociation of water into component ions of hydrogen and oxygen. The reaction is represented at each respective electrode by:

Anode (oxidization)

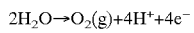

$$2H_2O \rightarrow O_2(g) + 4H^+ + 4e^-$$

Cathode (reduction)

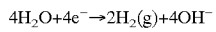

$$4H_2O + 4e^- \rightarrow 2H_2(g) + 4OH^-$$

Electrolysis promotes active remediation mechanisms in groundwater contaminated with petroleum hydrocarbons (or other organic compounds) by creating hydrogen and oxygen ions to carry electrical current across the circuit, and forming hydrogen and oxygen atoms that combine to form molecular $H_2$ and $O_2$ gas. Hydrogen gas is sparingly soluble in water and most of it escapes to the vapor phase. Oxygen is more soluble, and as the gas forms, some immediately dissolves in the groundwater, increasing the dissolved oxygen content. This dissolved oxygen provides a means by which bacteria can break down petroleum hydrocarbons in groundwater. The scale of this affect is within the well bore, and outside the well bore as far as the oxygen demand for chemical and biological sources is satisfied.

In addition to increasing oxygen content, the electrolysis process changes the oxidation/reduction potential (ORP) in groundwater to favor the oxidation of chemical species occurring in the groundwater and aquifer materials in contact with water. This has the effect of improving the potential for breakdown of organic contaminants dissolved in groundwater. The scale of this effect can extend to a significant distance outside the well bore by water transport. As ORP increases, chemical oxygen demand decreases due to decreasing reduced mineral concentrations (e.g., ferrous to ferric iron).

In addition, in the electrolytic process, hydroxyl radicals are formed between the electrodes in an intermediate reaction. Petroleum hydrocarbons and other organic compounds passing between the electrodes while they are energized can be broken down to carbon dioxide and water by chemical oxidation. The scale of this effect is within the electrolytic cell only.

In one prior art electrolysis system, a longitudinally mounted electrode pair is employed and groundwater is circulated multiple times between solid plate electrodes and a storage tank until the desired concentration of dissolved oxygen is reached. The water is then passed out into the aquifer. The disadvantage of this system is that the longitudinal mounting restricts the possible flow rate through the cell, requiring multiple passes. The power applied is limited due to the electrochemical properties of the electrodes, which limits the amount of oxygen that can be generated at any given time. Additionally, if precipitation or other clogging occurs within the cell, flow could be interrupted. The potential for such clogging is increased due to the number of times the water must flow past the electrodes.

OBJECTS OF THE INVENTION

It is an object of the present invention to overcome the foregoing disadvantages and limitations of the prior art.

It is a further object of the present invention to provide a groundwater oxygenation and electrolysis system that efficiently electrolyzes groundwater with improved flow characteristics and reduced power consumption.

It is a further object of the present invention to provide a novel configuration and an arrangement of electrodes and a method of using them to maximize the exposure of groundwater in situ to electrolysis comprising an electrolytic catalytic oxidation (ECO) cell having an innovative configuration of electrodes in a cartridge designed to maximize water contact with an efficiently designed affecting system.

It is a further object of the present invention to provide a groundwater oxygenation and electrolysis system that provides adequate electrolysis and oxygen production for groundwater treatment purposes in a single pass.

It is a further object of the present invention to provide a groundwater oxygenation and electrolysis system that is simple, inexpensive and reliable.

SUMMARY OF THE PRESENT INVENTION

These and other features and advantages are accomplished in accordance with a preferred embodiment of the present invention comprising a system for in situ treatment of groundwater or soil comprising an electrolytic catalytic oxidation or gas generation cartridge having a plurality of mesh electrodes disposed in a cartridge housing, arranged generally transversely to the direction of imposed water flow, such that imposing an appropriate voltage across electrodes dissociates passing water into molecular oxygen or hydrogen when energized, said mesh construction of the electrodes allowing water flow to be essentially through the electrodes, said electrodes being separated by a relatively thin, porous, non-conductive separator.

In accordance with a preferred aspect of this embodiment, the electrodes include cores having titanium.

In accordance with another preferred aspect of this embodiment, the cartridge anodes are plated with a mixed metal oxide taken from the group of iridium oxide and ruthenium oxide.

In accordance with another preferred aspect of this embodiment, the cartridge cathodes are plated with an alloy predominantly comprising nickel and chromium.

DETAILED DESCRIPTION

Figure 1:
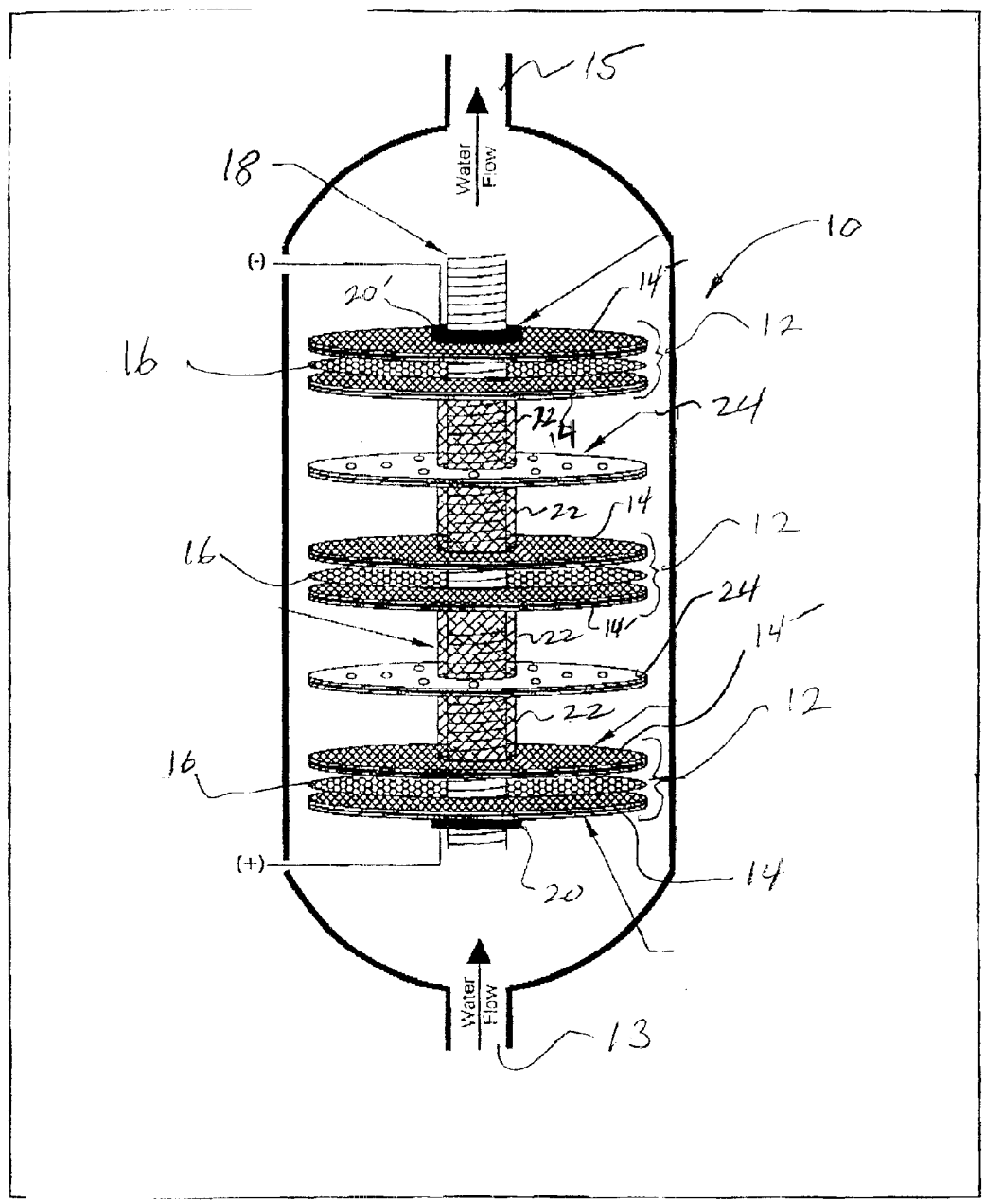
FIG. 1 is a somewhat schematic cross-section of a cartridge in accordance with a preferred embodiment of the present invention, with four pairs of electrodes.

Turning now to the drawings in detail, and initially to FIG. 1 thereof, a cartridge 10 having a housing 11 and three cells 12 comprising pairs of electrodes 14 (anode) and 14' (cathode) are depicted. The electrodes 14, 14' are constructed out of a mesh material and are placed transverse to water flow, so that water flows through the plane of the mesh. The electrodes are separated by an insulating porous fiberglass screen 16 to minimize the electrode spacing and prevent a short circuit. The housing 11 also includes an intake opening 13 and a discharge opening 15 for permitting water flow through the cartridge.

Preferably, the cores of the electrodes 14, 14' are constructed substantially of titanium, combining low electrical resistance with low activity, reducing metal loss during system operation. In addition, the anodes 14 are preferably plated with a mixed metal oxide taken from the group of iridium oxide and ruthenium oxide to catalytically improve the production of oxygen. The cathodes 14' preferably are plated with an alloy predominantly comprising nickel and chromium, most preferably having in the range of 40–60 percent nickel and 10–30 percent chromium, which alloy may also include 0.5–2 percent cobalt. An alloy sold under the commercial name Hastelloy (R) is suitable for plating the cathode.

The close spacing of the electrodes 14, 14' minimizes the electrical resistance of the water separating the cathode 14' and anode 14. Because there is an inverse relationship in most groundwater between electrode spacing and gas production, the close spacing allows the electrolysis to proceed efficiently and with a reduced consumption of electric power for the electrolysis.

In a prior art system using solid electrodes placed in opposed relationship with their planes parallel to the flow, close electrode spacing can tend to increase fluid friction, increasing pumping requirements and/or decreasing system capacity. However, because the electrodes 14, 14' of the present invention are constructed out of a mesh material and placed transverse to water flow, resistance to flow through the electrodes is minimized, while the relative surface area of the electrodes in contact with the groundwater is increased.

The physical limitations of an in situ installation limit the size of the electrolysis unit, which limits the effective area of exposure to electrolytic catalytic oxidation. The present invention overcomes this problem by employing multiple cells 12 of mesh electrode pairs within a single cartridge 10. The cells 12 are held together by a rod 18, which is conveniently nonconductive nylon. A conductive rod 18 may be employed, however, depending upon how power is delivered to the electrodes of the cells. The electrical circuit is constructed such that a series connection joins several cells together, the number of cells 12 being determined based upon groundwater conditions and power capabilities. Electric power is connected to the endmost anode 14 and cathode 14' through stainless steel nuts 20. The paired cathode 14', in turn, is electrically connected to the next cathode 14' of the next cell by means of stainless steel bushings 22. The next paired anode 14, in turn, is electrically connected to the next anode 14 of the next cell 12 by means of stainless steel bushings 22, and so on. Although three cells 12 are depicted, it is to be understood that any number may be employed.

The capacitance effect is avoided by sufficient separation by physical distance and an insulating porous plastic disk 24 between individual electrolytic cells 12 within the cartridge 10. The specific spacing requirements are dependent upon the specific conductance of the groundwater, and influenced by contaminant concentration, and thus varies from installation to installation. However, the spacing should be as small as reasonably possible while still avoiding a capacitance effect.

Figure 2:
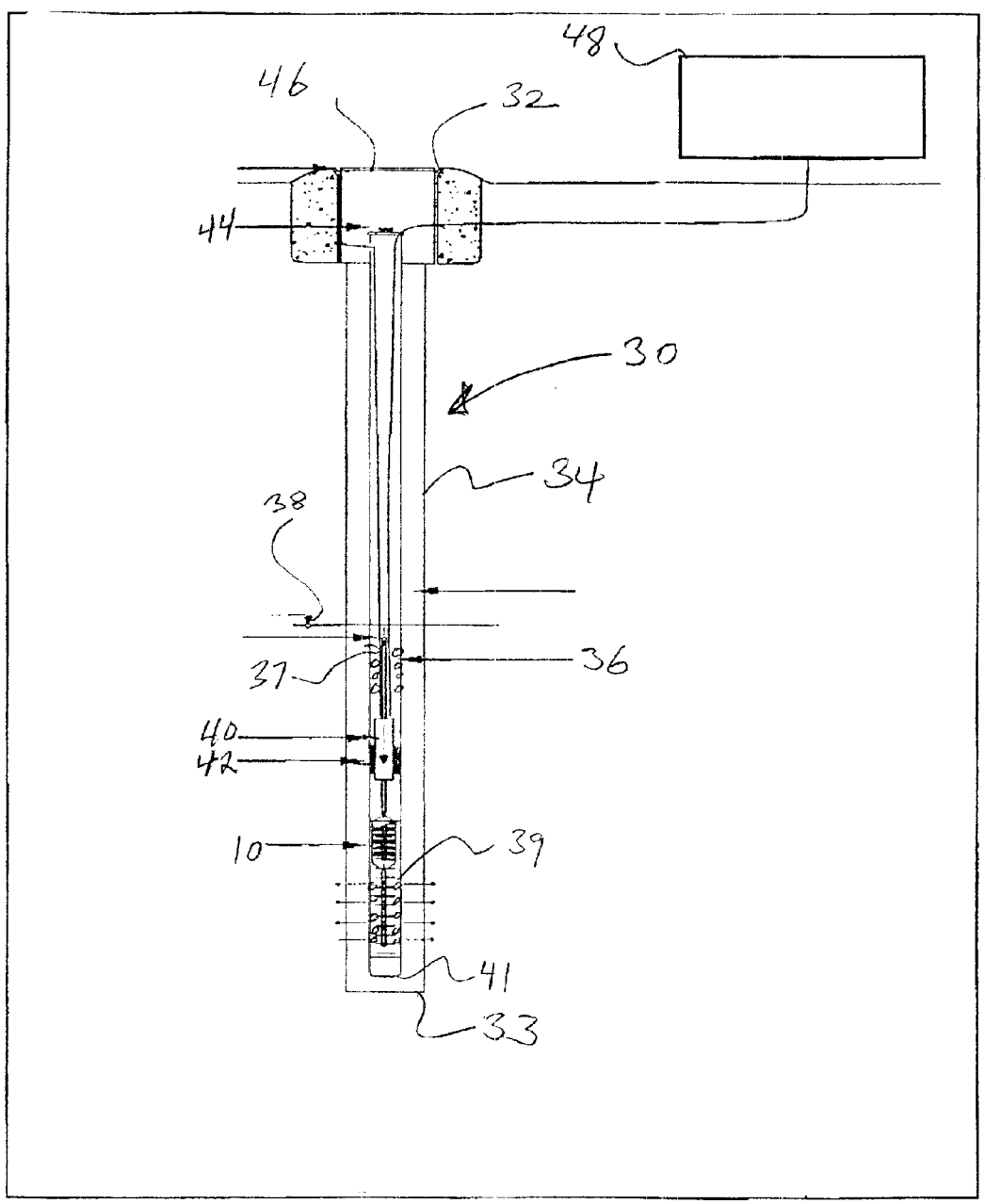
FIG. 2 is a cross-section of a treatment well including a cartridge in accordance with a preferred embodiment of the present invention.

Turning now to FIG. 2, a typical treatment well 30 employing a cartridge 10 is depicted. Well 30 has a concrete reinforced opening 32 and a bore 34 into the ground. The well 30 also includes a well casing 36 extending to near the bottom 33 of bore 34, the casing being conveniently made from polyvinylchloride, or other suitable material. Sandpack is included between casing 36 and the well bore 34. Casing 36 has a porous portion 37 near the surface 38 of the groundwater acting as an intake port and a porous portion 39 near the bottom 41 of the casing acting as a discharge port to permit groundwater flow into, and out of, the casing.

The intake and discharge ports 37 and 39 are separated by a distance, the distance being aquifer and contaminant dependent, varying with hydrocarbon smear zone thickness and hydraulic conductivity. The separation distance between intake and discharge ports varies depending upon the installation, but is normally between about 5 and 20 feet. However, considerably shorter and longer distances are possible.

In order to distribute the treated water and modified electrochemical characteristics of water exposed to electrolysis, the invention utilizes a circulation system within the treatment well. For the remediation of petroleum hydrocarbons, groundwater is pumped via an in situ pump 40 sealed to the casing 36 with a rubber packer 42 through the treatment cartridge 10 and discharged back into the aquifer formation (FIG. 2). The intake 37 for groundwater is set near the water table to include any separate-phase hydrocarbons. Treated water is discharged near the bottom of the well, to increase contact time between untreated groundwater and free-phase oxygen bubbles created by the electrolysis cartridge. Depending upon characteristics of the groundwater and the aquifer, a pumping rate of preferably between 1 and 5 gpm will be established to sufficiently treat groundwater and promote the development of a circulation cell in the aquifer around the well bore. Considerably higher and lower circulation rates are also possible, depending upon conditions.

The hydrogen gas resulting from the reaction at the cathode in the electrolytic cell is sparingly soluble in water and bubbles directly to the water table. Because of this, the well preferably has a vented well cap 44 at the top of the casing 36 and a vented well cap 46 to prevent the buildup of flammable gas concentrations within the treatment well. Power is delivered to the pump 40 and electrode cells 12 by means of supply/controller 48.

The result of the present invention is an efficient electrolysis system that exposes a large portion of water passing through the cartridge 10 directly to electrolysis. By routing water through, rather than between, the electrodes, the amount of water treated in a pass increases, eliminating the necessity to recirculate the water through the cell a number of times. Thus, adequate electrolysis can generally be accomplished in a single pass.

Although the present invention has been described with reference to preferred embodiments thereof, it is to be understood that many modifications of such embodiments will be apparent to those skilled in the art upon reading the present disclosure. The scope of the invention is not limited to the specific embodiments disclosed; rather, the scope of the invention is reflected in the appended claims and equivalents thereof.

What is claimed is:

1. A groundwater treatment system comprising:
    a circulation pump disposed in a well bore casing below a water table, and a gas generation cartridge disposed in the well bore casing, wherein the gas generation cartridge contains a plurality of metallic porous electrode cells disposed in a cartridge housing generally arranged transversely to the direction of water, wherein the electrode cells are separated by an insulating porous plastic disk and wherein water is imposed through the gas generation cartridge by the circulation pump, and wherein appropriate voltage is imposed across the electrode cells, whereby water is dissociated into molecular oxygen and hydrogen, and wherein the electrode cells allow water to flow through the electrode cells; and
    a rod disposed within the gas generation cartridge, wherein the electrode cells are attached to the rod.

2. The system of claim 1, wherein dissociation of the passing water into molecular oxygen and hydrogen occurs below the water table.

3. The system of claim 1, wherein the electrode cells include cores containing titanium.

4. The system of claim 1, wherein the electrode cells contain an anode and a cathode, wherein the anode is plated with a mixed metal oxide selected from the group consisting of iridium oxide, ruthenium oxide and nickel.

5. The system of claim 4, wherein the anode and cathode are separated by a relatively thin, porous, non-conductive separator.

6. The system of claim 4, wherein the cathode is plated with an alloy comprising predominantly nickel and chromium.

7. The system of claim 6, wherein the alloy contains in the range of from about 40 to about 60 percent nickel.

8. The system of claim 6, wherein the alloy contains in the range of from about 10 to about 30 percent chromium.

9. The system of claim 6, wherein the alloy contains in the range of from about 0.5 to about 2 percent cobalt.

10. The system of claim 1, wherein the electrode cells are mesh electrode cells.

11. The system of claim 1, wherein the gas generation cartridge contains at least 3 pairs of metallic porous electrodes.

12. The system of claim 1, wherein the well bore casing has a upper porous portion near the surface of the groundwater and a lower porous portion near the bottom of the casing.

13. The system of claim 12, wherein water is imposed through the gas generation cartridge and discharged through the lower porous portion of the well casing.

14. The system of claim 12, wherein the distance between the upper porous portion and the lower porous portion is in the range of from about 5 to about 20 feet.

15. The system of claim 1, wherein the circulation pump is sealed to the well bore casing with a rubber packer.

16. The system of claim 1, wherein the circulation pump and electrode cells are powered by a supply/controller.

* * * * *